US012065018B2

United States Patent
Radke et al.

(10) Patent No.: US 12,065,018 B2
(45) Date of Patent: Aug. 20, 2024

(54) TRANSPORT REFRIGERATION SYSTEMS

(71) Applicant: Carrier Corporation, Palm Beach Gardens, FL (US)

(72) Inventors: Michael Radke, Hasbergen (DE); Marius Günther, Wallenhorst (DE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 223 days.

(21) Appl. No.: 17/541,492

(22) Filed: Dec. 3, 2021

(65) Prior Publication Data

US 2022/0194175 A1 Jun. 23, 2022

(30) Foreign Application Priority Data

Dec. 18, 2020 (EP) .................................. 20215704

(51) Int. Cl.
*B60H 1/32* (2006.01)

(52) U.S. Cl.
CPC ......... *B60H 1/3205* (2013.01); *B60H 1/3222* (2013.01); *B60H 1/3232* (2013.01);
(Continued)

(58) Field of Classification Search
CPC .... B60H 2001/3238; B60H 2001/3292; B60H 2001/3269; B60H 2001/327;
(Continued)

(56) References Cited

U.S. PATENT DOCUMENTS 4,959,969 A 10/1990 Okamoto et al.
5,907,955 A 6/1999 Park
(Continued)

FOREIGN PATENT DOCUMENTS

CN 1357737 A 7/2002
CN 1216263 C 8/2005
(Continued)

OTHER PUBLICATIONS

European Search Report for application EP 20215704.6, Issued Sep. 1, 2021, 11 pages.

*Primary Examiner* — Nelson J Nieves
*Assistant Examiner* — Meraj A Shaikh
(74) *Attorney, Agent, or Firm* — CANTOR COLBURN LLP

(57) ABSTRACT

A method of controlling a transport refrigeration system including a refrigeration unit including a compressor, and a refrigerated compartment operably coupled to the refrigeration unit, and the transport refrigeration system is operable in a standby mode in which the transport refrigeration system is connected to and powered by a mains power source, the method including providing a first compressor speed, wherein the first compressor speed is less than a maximum speed of the compressor of the refrigeration unit; determining when the transport refrigeration system is being operated in the standby mode; determining whether a current time is within a first time period; and when it is determined that the transport refrigeration system is being operated in the standby mode, and when it is determined that the current time is within the first time period: operating the compressor of the refrigeration unit in accordance with the first compressor speed.

15 Claims, 1 Drawing Sheet

(52) U.S. Cl.
CPC ............... *B60H 2001/3238* (2013.01); *B60H 2001/3255* (2013.01); *B60H 2001/3272* (2013.01); *B60H 2001/3292* (2013.01)

(58) Field of Classification Search
CPC .... B60H 2001/3272; B60H 2001/3275; B60H 2001/3277; B60H 2001/3282
See application file for complete search history.

(56) References Cited

U.S. PATENT DOCUMENTS

| | | | |
|---|---|---|---|
| 9,745,908 | B2 | 8/2017 | Lucht et al. |
| 9,975,403 | B2 | 5/2018 | Rusignuolo et al. |
| 10,353,410 | B2 | 7/2019 | Bates et al. |
| 10,682,897 | B2 | 6/2020 | Lucht et al. |
| 2018/0001745 | A1 | 1/2018 | Vehr et al. |
| 2018/0001746 | A1* | 1/2018 | Vehr .................... B60H 1/3226 |
| 2019/0299749 | A1* | 10/2019 | Lattin .................... F25B 27/00 |
| 2020/0231041 | A1 | 7/2020 | Lavrich et al. |

FOREIGN PATENT DOCUMENTS

| | | |
|---|---|---|
| CN | 201497272 U | 6/2010 |
| CN | 202267261 U | 6/2012 |
| CN | 204007202 U | 12/2014 |
| CN | 205351904 U | 6/2016 |
| CN | 106123473 A | 11/2016 |
| CN | 106274630 A | 1/2017 |
| CN | 105627647 B | 10/2017 |
| CN | 107289695 A | 10/2017 |
| CN | 109373799 A | 2/2019 |
| CN | 110986263 A | 4/2020 |
| EP | 2940392 B1 | 11/2017 |
| EP | 2743110 B1 | 3/2019 |
| EP | 3547483 A1 | 10/2019 |
| WO | 2018005942 A1 | 1/2018 |
| WO | 2019071109 A1 | 4/2019 |
| WO | 2019202353 A1 | 10/2019 |

* cited by examiner

TRANSPORT REFRIGERATION SYSTEMS

FOREIGN PRIORITY

This application claims priority to European Patent Application No. 20215704.6, filed Dec. 18, 2020, and all the benefits accruing therefrom under 35 U.S.C. § 119, the contents of which in its entirety are herein incorporated by reference.

TECHNICAL FIELD

The present disclosure relates to transport refrigeration systems, and more particularly to an apparatus and method for controlling such transport refrigeration systems.

BACKGROUND

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system. A transport refrigeration system is mounted to the vehicle or to the trailer in operative association with a cargo space within the vehicle or trailer for maintaining a controlled temperature environment within the cargo space.

Conventionally, transport refrigeration systems used in connection with refrigerated vehicles and refrigerated trailers include a refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. The refrigerant compressor operates as a pump to pressurise, and control the circulation of, the refrigerant. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated vehicles and refrigerated trailers, the compressor, and typically other components of the refrigeration unit, is powered during transit by a prime mover (e.g. a diesel engine).

It is often desired that a refrigerated compartment also be cooled when the vehicle is not moving and/or when the prime mover (e.g. diesel engine) is not active, e.g. in order to ensure there is no damage or spoilage to temperature-sensitive cargo. Thus, in some conventional refrigeration units there is provided electrical architecture such that the refrigeration unit can be connected to a mains power source and the compressor powered by the mains power source, so that the unit can cool the refrigerated compartment while the vehicle is, for example, parked at standby in a loading bay of a warehouse.

Transport refrigeration systems can generate significant levels of noise, especially if a plurality of transport refrigeration vehicles are on standby at the same warehouse. Warehouses are increasingly likely to be situated in areas where local noise regulations are implemented, and it would thus be advantageous to provide a system where these noise levels can be managed.

SUMMARY

Viewed from a first aspect, the present invention provides a method of controlling a transport refrigeration system, wherein the transport refrigeration system comprises a refrigeration unit comprising a compressor, and a refrigerated compartment operably coupled to the refrigeration unit, and wherein the transport refrigeration system is operable in a standby mode in which the transport refrigeration system is connected to and powered by a mains power source, the method comprising: providing a first compressor speed, wherein the first compressor speed is less than a maximum speed of the compressor of the refrigeration unit; determining when the transport refrigeration system is being operated in the standby mode; determining whether a current time is within a first time period; and when it is determined that the transport refrigeration system is being operated in the standby mode, and when it is determined that the current time is within the first time period: operating the compressor of the refrigeration unit in accordance with the first compressor speed.

The applicant has recognised that a transport refrigeration system, when operated in a standby mode, is likely to be located in the same area as a plurality of other transport refrigeration systems, such as at a warehouse. Furthermore, these areas may be subject to local noise regulations. Advantageously, the method provided allows the speed of the compressor of the transport refrigeration system to be restricted when in standby mode and during a first time period (i.e. a period when noise restrictions may be in place). Thus the noise produced by the refrigeration system can be suitably mitigated during a period of time when it may be necessary to do so.

Operating the compressor in accordance with the first compressor speed comprises running the compressor at a speed that does not exceed the first compressor speed, i.e. the first compressor speed may be considered to be a compressor speed limit. Thus, operating the compressor in accordance with the first compressor speed may include running the compressor at any suitable speed that is less than or equal to the first speed, including non-zero speeds and 0 RPM (i.e. the compressor is turned off).

During the first time period, operating the compressor in accordance with the first compressor speed may comprise operating the compressor in accordance with a speed profile. The speed profile may be uniform, i.e. the compressor is operated at a constant speed (not exceeding the first compressor speed) during the first time period. The speed profile may vary continuously, wherein the speed profile, at any one time during the first time period, may vary e.g. between 0 RPM and the first compressor speed (i.e. the compressor speed limit).

By providing a method of varying the speed of the compressor during the first time period, the cooling demand of the refrigerated compartment can be met while limiting the noise produced during this period.

The speed profile may comprise discrete 'on' and 'off' periods arranged during the first time period. During an 'off' period, the compressor is turned off (i.e. ran at 0 RPM).

During 'on' periods, the compressor is operated at a non-zero speed that does not exceed the first compressor speed (i.e. the compressor speed limit).

The maximum speed of the compressor may be the fastest possible operation speed of the compressor.

Alternatively, the maximum speed of the compressor may be the speed of the compressor which has been selected for standard operation. In this case, the standard operating speed of the compressor is chosen as the maximum speed the compressor can be run at without compromising the durability and/or reliability of the transport refrigeration system.

The first compressor speed (the compressor speed limit) may be any suitable (non-zero) speed that is less than the maximum speed of the compressor, such as for example (i) <10% of the maximum speed of the compressor; (ii) 10-20% of the maximum speed of the compressor; (iii) 20-30% of the maximum speed of the compressor; (iv) 30-40% of the maximum speed of the compressor; (v) 40-50% of the maximum speed of the compressor; (vi) 50-60% of the maximum speed of the compressor; (vii) 60-70% of the maximum speed of the compressor; (viii) 70-80% of the maximum speed of the compressor; (ix) 80-90% of the maximum speed of the compressor; or (x) >90% of the maximum speed of the compressor.

The compressor may be operated, e.g. controlled, by a controller of the transport refrigeration system.

The compressor may comprise an AC electric motor, and the transport refrigeration system may comprise a power supply system configured to be connected to the mains power source and configured to supply power to the AC electric motor. The electric motor and the power supply system together may form a variable-frequency drive.

As such, the power supply system may be configured to convert and/or transform the AC power supplied to the electric motor and may comprise at least one power conversion component. The power supply system may comprise at least one of an AC to AC voltage/frequency converter, an AC to DC rectifier, a DC to AC inverter, and a DC to DC voltage converter.

The speed, and torque, of the compressor may be controlled by the power supply system by adjusting the frequency and/or voltage of the AC power supplied to the electric motor. The power supply system may not supply power to the electric motor when the compressor is to be turned off. The controller may command the power supply system to adjust the frequency of the AC power supplied to the compressor.

The method may comprise providing, e.g. obtaining, measuring or otherwise determining, information about the transport refrigeration system. The information may include an internal temperature of the refrigerated compartment (e.g. monitored by a temperature sensor in the refrigerated compartment) and/or a target internal temperature (e.g. "set-point") of the refrigerated compartment. The set-point may be manually provided (e.g. input into a user interface of the transport refrigeration system) by a user, e.g. a driver. The information may include specifications of the refrigeration unit (e.g. a cooling capacity of the refrigeration unit) and/or the compressor (e.g. a maximum speed of the compressor).

The method may comprise transmitting at least some of the information to a remote server, such as the transport refrigeration system transmitting at least the information indicative of the internal temperature of the refrigerated compartment to the remote server, optionally together with some of all of the other information. The information may be transmitted just once, e.g. before the beginning of the first time period. Alternatively, the information may be transmitted periodically, e.g. while the transport refrigeration unit is in standby mode.

The method may comprise determining (e.g. calculating), by the remote server and based on the information, the first compressor speed (for the first time period).

The method may comprise transmitting the first compressor speed from the remote server to the transport refrigeration system.

The transport refrigeration system may receive the first compressor speed and operate the compressor of the refrigeration unit in accordance with the first compressor speed.

Additionally or alternatively, the method may comprise determining (e.g. calculating), by the remote server and based on the information, the speed profile (for the first time period). Determining the speed profile may comprise determining the on and off periods, arranged during the first time period, of the speed profile. The method may comprise transmitting the speed profile, optionally including on and off periods, to the transport refrigeration system, and may further comprise operating the compressor of the refrigeration unit in accordance with the speed profile.

The information may be used to review, e.g. control, the operation of the transport refrigeration unit and adjust the operation of the compressor.

For example, if the remote server determines that the internal temperature of the refrigerated compartment is outside safe bounds of the set-point (e.g. where a door of the refrigerated compartment has been left open inadvertently), then the first compressor speed (and/or the speed profile) may be adjusted in accordance with the information.

In other embodiments, the method may include operating the compressor in an override mode in which the compressor may be run at any desired speed, including a speed greater than the first compressor speed. In a normal mode of operation, the compressor is operated in accordance with the first compressor speed as received from the remote server (as described above). However, in the event that the internal temperature of the refrigerated compartment is outside safe bounds of the set-point, the transport refrigeration system may need to respond before the remote server is updated with information indicative of this issue. Therefore the transport refrigeration system is able to operate the compressor in an override mode in which the operational instructions from the remote server are overridden. The compressor may be run in the override mode until the information indicates the compressor can be operated in accordance with the first compressor speed i.e. the internal temperature of the refrigerated compartment is within a safe range of the set-point.

Although in the embodiments described above a remote server provides the first compressor speed, in alternative embodiments the first compressor speed, optionally together with the first time period, may be manually provided (e.g. input into a user interface of the transport refrigeration system) by a user e.g. a driver.

In various embodiments, the first time period may be the entire period during which the transport refrigeration system is in the standby mode, i.e. when the transport refrigeration system is connected to the mains power source. Alternatively, the first time period may be a time period during which it is desired to reduce noise levels e.g. at night, and/or during a time period when local noise restrictions are in place.

The transport refrigeration system may comprise a plurality of refrigerated compartments, each one of the plurality of refrigerated compartments being operably coupled to a respective refrigeration unit, and the method of controlling the transport refrigeration system may comprise: obtaining information including an internal temperature and/or a target internal temperature of each refrigeration compartment of the plurality of refrigeration compartments; determining, based on the information, a set of first compressor speeds comprising a first compressor speed (e.g. compressor speed limit) for the compressor of each refrigeration unit; and operating each compressor in accordance with the corresponding first compressor speed of the set of first compressor speeds when the current time is within the first time period.

Advantageously, the speed of each compressor of the transport refrigeration system can be independently limited in order to mitigate the total noise produced by the transport refrigeration system. The information can used to calculate the cooling requirements of the respective refrigerated compartments, and to determine how each compressor should be operated in accordance with the set of compressor speed limits to reduce the total noise of the transport refrigeration system but also ensure the cooling demands are met.

Operating the compressor(s) in accordance with the set of first compressor speeds (the set of compressor speed limits) may comprise operating the compressor(s) in accordance with a set of speed profiles. One or more or each speed profile may be determined to be complementary to one or more or each of the other speed profiles of the set of speed profiles. For example, the 'off' period (or period of low-speed operation) of one or more (e.g. a sub-set) of the plurality of compressors may coincide with the 'on' period (or period of high-speed operation) of a different one or more (e.g. a different sub-set) of the plurality of compressors.

Viewed from a second aspect, the present invention provides a transport refrigeration system operable in a standby mode in which the transport refrigeration system is connected to and powered by a mains power source, the transport refrigeration system comprising: a refrigeration unit comprising a compressor; a refrigerated compartment operably coupled to the refrigeration unit; and a controller, wherein the controller is configured to: receive a first compressor speed, wherein the first compressor speed is less than a maximum speed of the compressor of the refrigeration unit; determine when the transport refrigeration system is being operated in the standby mode; determine whether a current time is within a first time period; and when it is determined that the transport refrigeration system is being operated in the standby mode, and when it is determined that the current time is within the first time period: operate the compressor of the refrigeration unit in accordance with the first compressor speed.

The controller may be configured to operate the compressor in accordance with the first compressor speed by running the compressor at a speed that does not exceed the first compressor speed, i.e. the first compressor speed may be considered to be a compressor speed limit. Thus, operating the compressor in accordance with the first compressor speed may include running the compressor at any suitable speed that is less than or equal to the first speed, including non-zero speeds and 0 RPM (i.e. the compressor is turned off).

During the first time period, operating the compressor in accordance with the first compressor speed may comprise operating the compressor in accordance with a speed profile. The speed profile may be uniform, i.e. the compressor is operated at a constant speed (not exceeding the first compressor speed) during the first time period. The speed profile may vary continuously, wherein the speed profile, at any one time during the first time period, may vary e.g. between 0 RPM and the first compressor speed (i.e. the compressor speed limit).

The speed profile may comprise discrete 'on' and 'off' periods arranged during the first time period. During an 'off' period, the compressor is turned off (i.e. ran at 0 RPM). During 'on' periods, the compressor is operated at a speed greater than 0 RPM but that does not exceed the first compressor speed (i.e. the compressor speed limit).

The maximum speed of the compressor may be the fastest possible operation speed of the compressor.

Alternatively, the maximum speed of the compressor may be the speed of the compressor which has been selected for standard operation. In this case, the standard operating speed of the compressor is chosen as the maximum speed the compressor can be run at without compromising the durability and/or reliability of the transport refrigeration system.

The first compressor speed (the compressor speed limit) may be any suitable (non-zero) speed that is less than the maximum speed of the compressor, such as for example (i) <10% of the maximum speed of the compressor; (ii) 10-20% of the maximum speed of the compressor; (iii) 20-30% of the maximum speed of the compressor; (iv) 30-40% of the maximum speed of the compressor; (v) 40-50% of the maximum speed of the compressor; (vi) 50-60% of the maximum speed of the compressor; (vii) 60-70% of the maximum speed of the compressor; (viii) 70-80% of the maximum speed of the compressor; (ix) 80-90% of the maximum speed of the compressor; or (x) >90% of the maximum speed of the compressor.

The compressor may comprise an AC electric motor, and the transport refrigeration system may comprise a power supply system configured to be connected to the mains power source and configured to supply power to the electric motor. The electric motor and the power supply system together may form a variable-frequency drive.

As such, the power supply system may be configured to convert and/or transform the AC power supplied to the electric motor and may comprise at least one power conversion component. The power supply system may preferably comprise an AC to AC voltage/frequency converter, but may additionally comprise an AC to DC rectifier, a DC to AC inverter, or a DC to DC voltage converter.

The speed, and torque, of the compressor may be controlled by the power supply system by adjusting the frequency and/or voltage of the AC power supplied to the electric motor. The power supply system may not supply power to the electric motor when the compressor is to be turned off. The controller may be configured to command the power supply system to adjust the frequency of the AC power supplied to the compressor.

The controller may be configured to obtain, e.g. measure or otherwise determine, information about the transport refrigeration system. The information may include an internal temperature of the refrigerated compartment and/or a target internal temperature (e.g. "set-point") of the refrigerated compartment. The transport refrigeration system may comprise a sensor for monitoring an internal temperature of the refrigerated compartment. The set-point may be manually provided (e.g. input into a user interface of the transport refrigeration system) by a user, e.g. a driver. The information may include specifications of the refrigeration unit (e.g. a cooling capacity of the refrigeration unit) and/or the compressor (e.g. a maximum speed of the compressor).

The controller may be configured to transmit at least some of the information to a remote server, e.g. transmit at least the information indicative of the internal temperature of the refrigerated compartment to the remote server, optionally together with some of all of the other information. The controller may be configured to transmit at least some of the information just once, e.g. before the beginning of the first time period. Alternatively, the controller may transmit the information periodically, e.g. while the transport refrigeration unit is in standby mode.

The controller may be configured to receive the first compressor speed, optionally together with the first time period, from the remote server.

Additionally or alternatively, the controller may be configured to receive, from the remote server, the speed profile, optionally including on and off periods. The controller may be configured to operate the compressor of the refrigeration unit during the first time period in accordance with the speed profile received from the remote server.

Although in the embodiments described above a remote server provides the first compressor speed, in alternative embodiments the controller may be configured to receive the first time period and/or the first compressor speed manually, e.g. from manual input, by a driver or other user, into a user interface of the transport refrigeration system.

The controller may be configured to operate the compressor in an override mode in which the compressor may be run at any desired speed, including a speed greater than the first compressor speed. In a normal mode of operation, the compressor is operated in accordance with the first compressor speed as received from the remote server (as described above). However, in the event that the internal temperature of the refrigerated compartment is outside a safe range of the set-point, the transport refrigeration system may need to respond before the remote server is updated with information indicative of this issue. Therefore the controller may be configured to operate the compressor in an override mode in which the operational instructions from the remote server are overridden. The compressor may be run in the override mode until the information indicates the compressor can be operated in accordance with the first compressor speed i.e. the internal temperature of the refrigerated compartment is within a safe range of the set-point.

In various embodiments, the first time period may be the entire period during which the transport refrigeration system is in the standby mode, i.e. when the transport refrigeration system is connected to the mains power source. Alternatively, the first time period may be a time period during which it is desired to reduce noise levels e.g. at night, and/or during a time period when local noise restrictions are in place.

The transport refrigeration system may comprise a plurality of refrigeration units, each refrigeration unit operably coupled to a respective refrigeration compartment of the transport refrigeration system. The controller may be configured to obtain (e.g. measure) information including an internal temperature and/or a target internal temperature of each refrigeration compartment of the plurality of refrigeration compartments; determine, based on the information, a set of first compressor speeds comprising a first compressor speed (e.g. a compressor speed limit) for the compressor of each refrigeration unit (or receive such a set of first compressor speeds from a remote server); and operate each compressor in accordance with the corresponding first compressor speed of the set of first compressor speeds when the current time is within the first time period.

Operating the compressor(s) in accordance with the set of first compressor speeds (the set of compressor speed limits) may comprise operating the compressor(s) in accordance with a set of speed profiles. One or more or each speed profile may be determined to be complementary to one or more or each of the other speed profiles of the set of speed profiles. For example, the 'off' period (or period of low-speed operation) of one or more (e.g. a sub-set) of the plurality of compressors may coincide with the 'on' period (or period of high-speed operation) of a different one or more (e.g. a different sub-set) of the plurality of compressors.

Viewed from a third aspect, the present invention provides a method of controlling a plurality of transport refrigeration systems, each transport refrigeration system comprising a refrigeration unit comprising a compressor, and a refrigerated compartment operably coupled to the refrigeration unit, the method comprising: obtaining information including an internal temperature and/or a target internal temperature of the refrigerated compartment of each transport refrigeration system of the plurality of transport refrigeration systems; determining, based on the information, a set of compressor speeds comprising a compressor speed for the compressor of the refrigeration unit of each transport refrigeration system of the plurality of transport refrigeration systems; and operating the compressor of the refrigeration unit of each transport refrigeration system of the plurality of transport refrigeration systems in accordance with the corresponding compressor speed for that compressor from the set of compressor speeds.

The applicant has recognised that, conventionally, where a plurality of transport refrigeration systems are collected together in the same area, such as at a warehouse, noise peaks can be produced when a large number of the compressors are running at the same time. Advantageously, the method provided allows the speed of each compressor of the plurality of transport refrigeration systems to be constrained and/or controlled in a coordinated manner. Thus, the peak noise produced by a plurality of refrigeration systems in the same area can be limited by independently operating each compressor in accordance with the corresponding compressor speed for that compressor from the set of compressor speeds.

The temperature information of each of the refrigerated compartments can be utilised to help coordinate the operation of the transport refrigeration systems. For example, if the internal temperature of a refrigerated compartment is close to, or within a safe range of, the target internal temperature (i.e. set-point), then the compressor speed for the corresponding compressor can be limited. If the internal temperature of a different refrigerated compartment is far away from, or outside a safe range of, the target internal temperature, then the compressor speed for the corresponding compressor may need to be altered e.g. increased. The method can balance the compressor speed increases/decreases across the set of the compressor speeds, thus ensuring that the total noise produced at any given time can be reduced or minimised.

Similarly, the method may be implemented to allow the speed of each compressor of the plurality of transport refrigeration systems to be constrained and/or controlled in a coordinated manner to avoid power consumption peaks. Thus the method may be used to limit the peak power consumption, at any given time, of the plurality of transport refrigeration systems. Advantageously, a maximum power rating of the electrical infrastructure of the warehouse can be reduced, thereby saving cost.

Operating the compressor of the refrigeration unit of each transport refrigeration system of the plurality of transport refrigeration systems in accordance with the corresponding compressor speed for that compressor from the set of compressor speeds comprises running each compressor at a speed that does not exceed the corresponding compressor speed, i.e. the compressor speed may be considered to be a compressor speed limit. Thus, operating a compressor in accordance with the compressor speed for that compressor may include running the compressor at any suitable speed that is less than or equal to the corresponding compressor speed, including non-zero speeds and 0 RPM (i.e. the compressor is turned off).

The method may comprise obtaining a first time period such as a period of operation. The first time period may be a time period during which it is desired to reduced noise levels e.g. at night, and/or during a time period when local noise restrictions are in place.

The set of compressor speeds may comprise or may form part of a set of compressor speed profiles. Thus, the method may comprise determining, based on the information, a set of compressor speed profiles comprising a compressor speed profile for the compressor of the refrigeration unit of each transport refrigeration system of the plurality of transport refrigeration systems.

During the first time period (period of operation), operating each compressor in accordance with the corresponding compressor speed for that compressor from the set of compressor speeds may comprise operating each compressor in accordance with the corresponding speed profile for that compressor from the set of speed profiles.

At least one of the speed profiles may be uniform, i.e. a compressor is operated at a constant speed (that does not exceed the corresponding compressor speed (i.e. the corresponding compressor speed limit)) over the first time period. At least one of the speed profiles may vary continuously, wherein said speed profile(s), at any one time during the first time period, may take a value between 0 RPM and the corresponding compressor speed (i.e. the corresponding compressor speed limit).

At least one of the set of speed profiles may comprise discrete 'on' and 'off' sub-periods arranged during the first time period. During an 'off' sub-period, the compressor is turned off (i.e. ran at 0 RPM). During 'on' sub-periods, the compressor is operated at a non-zero speed that does not exceed the corresponding compressor speed (i.e. the corresponding compressor speed limit).

Advantageously, one or more or each speed profile may be determined to be complementary to (e.g. out of phase with) at least one other of the speed profiles of the set of speed profiles. Thus, when operating the compressor of the refrigeration unit of each transport refrigeration system in accordance with the corresponding speed profile for that compressor from the set of speed profiles, one or more or each speed profile may be complementary to (e.g. out of phase with) at least one other of the speed profiles of the set of speed profiles. For example, the 'off' sub-period (or period of low-speed operation) of one or more (e.g. a sub-set) of the plurality of compressors may coincide with the 'on' sub-period (or period of high-speed operation) of a different one or more (e.g. a different sub-set) of the plurality of compressors. Advantageously, by coordinating operation of the plurality of compressors, noise peaks can be avoided, and the total noise produced at any given time can be reduced or minimised.

Each transport refrigeration system may be operable in a standby mode in which the transport refrigeration system is connected to and powered by a mains power source. The method may comprise determining when each transport refrigeration system of the plurality of transport refrigeration systems is being operated in the standby mode. In this way, the method may only control those transport refrigeration systems which are in standby mode, as it is likely that a plurality of transport refrigeration systems in standby mode will be located in the same area, such as at a warehouse. In this way the compressor speeds may be limited only when necessary, e.g. when there are a large number of transport refrigeration systems collected together in the same area, and the noise generated may be significant.

Each transport refrigeration system may comprise a controller configured to control the operation of the compressor of that transport refrigeration system.

Each compressor may comprise an AC electric motor, and each transport refrigeration system may comprise a power supply system configured to be connected to the mains power source and configured to supply power to the AC electric motor. The electric motor and the power supply system together may form a variable-frequency drive.

As such, the power supply system may be configured to convert and/or transform the AC power supplied to the electric motor and may comprise at least one power conversion component. The power supply system may comprise at least one of an AC to AC voltage/frequency converter, an AC to DC rectifier, a DC to AC inverter, and a DC to DC voltage converter.

The speed, and torque, of the compressor may be controlled by the power supply system by adjusting the frequency and/or voltage of the AC power supplied to the electric motor. The power supply system may not supply power to the electric motor when the compressor is to be turned off. The controller may command the power supply system to adjust the frequency of the AC power supplied to the compressor.

The method comprises obtaining, e.g. measuring or otherwise determining, information about one or more or each transport refrigeration system of the plurality of transport refrigeration systems. The information may include specifications of one or more or each of the plurality of refrigeration units (e.g. a cooling capacity of a refrigeration unit) and/or one or more or each of the plurality of compressors (e.g. a maximum speed of a compressor).

The method may comprise transmitting at least some of the information to a remote server, such as (the controller of) one or more or each of the transport refrigeration systems transmitting at least the information indicative of the internal temperature of the refrigerated compartment of that transport refrigeration system to the remote server. The target internal temperature of the refrigerated compartment may also be transmitted to the remote server. Alternatively, the remote server may obtain the target internal temperature from elsewhere, e.g. a database of the remote server. The information may be transmitted just once, e.g. before the beginning of the first time period (period of operation). Alternatively, the information may be transmitted periodically, e.g. while the transport refrigeration unit is in standby mode. The communication between the remote server and (the controller of) each refrigeration system of the plurality of transport refrigeration systems may be through a wireless network such as a telematics network and/or wired connection(s).

Determining, based on the information, the set of compressor speeds may be carried out by the remote server. The remote server may compute the set of compressor speeds based on the information and optionally the first time period (period of operation). Accordingly, the remote server may be provided with the computational capacity (i.e. one or more processors and one or more databases) to process the information received from each of the plurality of transport refrigeration systems and to determine the set of compressor speeds.

The method may comprise the remote server transmitting the set of compressor speeds to the plurality of transport refrigeration systems, i.e. by transmitting the compressor speed for the compressor of each transport refrigeration system to the corresponding transport refrigeration system. Each transport refrigeration system may receive its corresponding compressor speed and operate its compressor in accordance with the received compressor speed.

As described above, the method may comprise determining (e.g. calculating), by the remote server and based on the information, the set of speed profiles (for the period of operation). Determining the set of speed profiles may comprise determining on and off sub-periods for one or more speed profiles of the set of speed profiles. The method may comprise the remote server transmitting the set of compressor speed profiles to the plurality of transport refrigeration systems, i.e. by transmitting each speed profile, optionally including on and off sub-periods, for the compressor of each transport refrigeration system to that transport refrigeration system. The method may further comprise each transport refrigeration system receiving its corresponding compressor speed profile, and may comprise operating the compressor of the refrigeration unit of the corresponding transport refrigeration system in accordance with the speed profile.

The information may be used to review, e.g. control the operation of the plurality of transport refrigeration systems and adjust the operation of at least one of the compressors accordingly.

For example, if it is determined that the internal temperature of one of the refrigerated compartments is outside safe bounds of the set-point of the refrigerated compartment (e.g. where a door of the refrigerated compartment has been left open inadvertently), then the corresponding compressor speed (and/or the speed profile) of the set of compressor speeds may be adjusted in accordance with the information.

In other embodiments, the method may include operating a compressor in an override mode in which the compressor may be run at any desired speed, including a speed greater than the corresponding compressor speed determined for that compressor. In a normal mode of operation, the compressor is operated in accordance with the compressor speed as received from the remote server (as described above). However, in the event that the internal temperature of the associated refrigerated compartment is outside a safe range of the set-point, the transport refrigeration system may need to respond as soon as possible, i.e. before the remote server is updated with information indicative of this issue. Therefore each transport refrigeration system is able to operate its compressor in an override mode in which the operational instructions from the remote server are overridden. Each compressor may be run in the override mode until the information indicates the compressor can be operated in accordance with the corresponding compressor speed i.e. the internal temperature of the refrigerated compartment is within a safe range of the set-point.

The remote server may be configured to receive an indication that a compressor is being run in an override mode. The remote server may include this indication in its considerations when calculating the set of compressor speeds. For example, one or more compressor speeds of the set of compressor speeds may be reduced in response to determining that one of the compressors is being operated in an override mode (i.e. run at maximum speed). Thus the total peak noise produced by the plurality of the transport refrigeration systems can be maintained at a reduced level, even if one of the compressors of the plurality of the transport refrigeration systems has to be run at an increased, e.g. maximum speed.

Viewed from a fourth aspect, the present invention provides a system comprising: a plurality of transport refrigeration systems, each transport refrigeration system comprising: a refrigeration unit comprising a compressor; a refrigerated compartment operably coupled to the refrigeration unit; and a controller configured to monitor an internal temperature of the refrigerated compartment and control the operation of the compressor; and a remote server configured to: obtain information including the internal temperature and a target internal temperature of the refrigerated compartment of each transport refrigeration system of the plurality of transport refrigeration systems; determine, based on the information, a set of compressor speeds comprising a compressor speed for the compressor of the refrigeration unit of each transport refrigeration system of the plurality of transport refrigeration systems; and transmit each compressor speed of the set of compressor speeds to the corresponding transport refrigeration system; wherein the controller of each transport refrigeration system of the plurality of transport refrigeration systems is configured to operate the compressor of the refrigeration unit of that transport refrigeration system in accordance with the corresponding compressor speed for that compressor from the set of compressor speeds.

The system of the fourth aspect of the invention provides the advantages as provided by the method of the third aspect of the invention.

Operating the compressor of the refrigeration unit of each transport refrigeration system of the plurality of transport refrigeration systems in accordance with the corresponding compressor speed for that compressor from the set of compressor speeds comprises running each compressor at a speed that does not exceed the corresponding compressor speed, i.e. the compressor speed may be considered to be a compressor speed limit. Thus, operating a compressor in accordance with the compressor speed for that compressor may include running the compressor at any suitable speed that is less than or equal to the corresponding compressor speed, including non-zero speeds and 0 RPM (i.e. the compressor is turned off).

The remote server may be configured to obtain a first time period such as a period of operation. The first time period may be a time period during which it is desired to reduced noise levels e.g. at night, and/or during a time period when local noise restrictions are in place.

The set of compressor speeds may comprise or may form part of a set of compressor speed profiles. Thus, the remote server may be configured to determine (e.g. calculate), based on the information, a set of compressor speed profiles comprising a compressor speed profile for the compressor of the refrigeration unit of each transport refrigeration system of the plurality of transport refrigeration systems.

During the first time period (period of operation), operating each compressor in accordance with the corresponding compressor speed for that compressor from the set of compressor speeds may comprise operating each compressor in accordance with the corresponding speed profile for that compressor from the set of speed profiles.

At least one of the speed profiles may be uniform, i.e. a compressor is operated at a constant speed (that does not exceed the corresponding compressor speed (i.e. the corresponding compressor speed limit)) over the first time period. At least one of the speed profiles may vary continuously, wherein said speed profile(s), at any one time during the first time period, may take a value between 0 RPM and the corresponding compressor speed (i.e. the corresponding compressor speed limit).

At least one of the set of speed profiles may comprise discrete 'on' and 'off' sub-periods arranged during the first time period. During an 'off' sub-period, the compressor is turned off (i.e. run at 0 RPM). During 'on' sub-periods, the compressor is operated at a non-zero speed that does not exceed the corresponding compressor speed (i.e. the corresponding compressor speed limit).

Advantageously, one or more or each speed profile may be determined to be complementary to (e.g. out of phase with) at least one other of the speed profiles of the set of speed profiles. Thus, when operating the compressor of the refrigeration unit of each transport refrigeration system in accordance with a corresponding speed profile for that compressor from the set of speed profiles, one or more or each speed profile may be complementary to (e.g. out of phase with) at least one other of the speed profiles of the set of speed profiles. For example, the 'off' sub-period (or period of low-speed operation) of one or more (e.g. a sub-set) of the plurality of compressors may coincide with the 'on' sub-period (or period of high-speed operation) of a different one or more (e.g. a different sub-set) of the plurality of compressors. Advantageously, by coordinating operation of the plurality of compressors, noise peaks can be avoided, and the total noise produced at any given time can be reduced or minimised.

Each transport refrigeration system may be operable in a standby mode in which the transport refrigeration system is connected to and powered by a mains power source. The remote server may be configured to determine when each transport refrigeration system of the plurality of transport refrigeration systems is being operated in the standby mode. In this way, the remote server may only control those transport refrigeration systems which are in standby mode, as it is likely that a plurality of transport refrigeration systems in standby mode will be located in the same area, such as at a warehouse (where the remote server may be situated). In this way, the compressor speeds may be limited only when necessary, e.g. when there are a large number of transport refrigeration systems collected together in the same area, and the noise generated may be significant.

Each compressor may comprise an AC electric motor, and each transport refrigeration system may comprise a power supply system configured to be connected to the mains power source and configured to supply power to the AC electric motor. The electric motor and the power supply system together may form a variable-frequency drive.

As such, the power supply system may be configured to convert and/or transform the AC power supplied to the electric motor and may comprise at least one power conversion component. The power supply system may comprise at least one of an AC to AC voltage/frequency converter, an AC to DC rectifier, a DC to AC inverter, and a DC to DC voltage converter.

The speed, and torque, of the compressor may be controlled by the power supply system by adjusting the frequency and/or voltage of the AC power supplied to the electric motor. The power supply system may not supply power to the electric motor when the compressor is to be turned off. The controller may command the power supply system to adjust the frequency of the AC power supplied to the compressor.

The information may include specifications of one or more or each of the plurality of refrigeration units (e.g. a cooling capacity of a refrigeration unit) and/or one or more or each of the plurality of compressors (e.g. a maximum speed of a compressor).

The controller of one or more or each of the transport refrigeration systems may be configured to transmit at least some of the information, of the respective refrigerated compartment, to the remote server. For example, the controller may transmit at least the information indicative of the internal temperature of the corresponding refrigerated compartment to the remote server. The target internal temperature of the refrigerated compartment may also be transmitted to the remote server. Alternatively, the remote server may obtain the target internal temperature(s) from elsewhere, e.g. a database of the remote server. The information may be transmitted just once, e.g. before the beginning of the first time period (period of operation). Alternatively, the information may be transmitted periodically, e.g. while the transport refrigeration unit is in standby mode. The communication between the remote server and the controller of each refrigeration system of the plurality of transport refrigeration systems may be through a wireless network such as a telematics network, and/or wired connection(s).

The remote server may be configured to compute the set of compressor speeds based on the information and optionally the first time period (period of operation). Accordingly, the remote server may comprise one or more processors and one or more databases, the remote server capable of processing the information received from each of the plurality of transport refrigeration systems and to determine the set of compressor speeds.

The remote server may be configured to transmit the set of compressor speeds to the plurality of transport refrigeration systems, i.e. to transmit the compressor speed for the compressor of each transport refrigeration system to the corresponding transport refrigeration system. Each transport refrigeration system may receive its corresponding compressor speed and operate its compressor in accordance with the received compressor speed.

As described above, the remote server may be configured to determine (e.g. calculate), based on the information, the set of speed profiles (for the period of operation). The remote server may be configured to determine on and off sub-periods for one or more or each speed profile of the set of speed profiles. The remote server may be configured to transmit the set of compressor speed profiles to the plurality of transport refrigeration systems, i.e. to transmit each speed profile, optionally including on and off sub-periods, for the compressor of each transport refrigeration system to that transport refrigeration system. Each controller may be configured to receive its corresponding compressor speed profile, and may be configured to operate the compressor of the refrigeration unit of the corresponding transport refrigeration system in accordance with the speed profile.

The information may be used to review, e.g. control the operation of the plurality of transport refrigeration systems and adjust the operation of at least one of the compressors accordingly.

For example, if it is determined that the internal temperature of one of the refrigerated compartments is outside safe bounds of the set-point of the refrigerated compartment (e.g. where a door of the refrigerated compartment has been left open inadvertently), then the corresponding compressor speed (and/or the speed profile) of the set of compressor speeds may be adjusted in accordance with the information.

In other embodiments, the controller may be configured to operate the corresponding compressor in an override mode in which the compressor may be run at any desired speed, including a speed greater than the compressor speed determined for that compressor. In a normal mode of operation, the compressor may be operated in accordance with the compressor speed as received from the remote server (as described above). However, in the event that the internal temperature of the associated refrigerated compartment is outside a safe range of the set-point, the transport refrigeration system may need to respond as soon as possible, i.e. before the remote server is updated with information indicative of this issue. Therefore the controller of each transport refrigeration system is able to operate its compressor in an override mode in which the operational instructions from the remote server are overridden. Each compressor may be run in the override mode until the information indicates the compressor can be operated in accordance with the corresponding compressor speed i.e. the internal temperature of the refrigerated compartment is within a safe range of the set-point.

The remote server may be configured to receive an indication that a compressor is being run in an override mode. The remote server may include this indication in its considerations when calculating the set of compressor speeds. For example, one or more compressor speeds of the set of compressor speeds may be reduced in response to determining that one of the compressors is being operated in an override mode (i.e. run at maximum speed). Thus the total peak noise produced by the plurality of the transport refrigeration systems can be maintained at a reduced level, even if one of the compressors of the plurality of the transport refrigeration systems has to be run at an increased, e.g. maximum, speed.

Viewed from a fifth aspect, the present invention provides a server for coordinating the control of a plurality of transport refrigeration systems, each transport refrigeration system comprising a refrigeration unit comprising a compressor, and a refrigerated compartment operably coupled to the refrigeration unit, the server configured to: obtain information including an internal temperature and/or a target internal temperature of the refrigerated compartment of each transport refrigeration system of the plurality of transport refrigeration systems; determine, based on the information, a set of compressor speeds comprising a compressor speed for the compressor of the refrigeration unit of each transport refrigeration system of the plurality of transport refrigeration systems; and transmit each compressor speed of the set of compressor speeds to the corresponding transport refrigeration system.

The server of the fifth aspect of the invention provides the advantages as provided by the method of the third aspect of the invention. The server of the fifth aspect of the invention can include any one or more or each of the optional features described above, as appropriate.

The server may be a remote server, i.e. a server that is remote from the plurality of transport refrigeration systems.

BRIEF DESCRIPTION OF THE DRAWINGS

A preferred embodiment of the present invention will now be described in greater detail, by way of example only and with reference to the drawings, in which.

DETAILED DESCRIPTION

Figure 1:
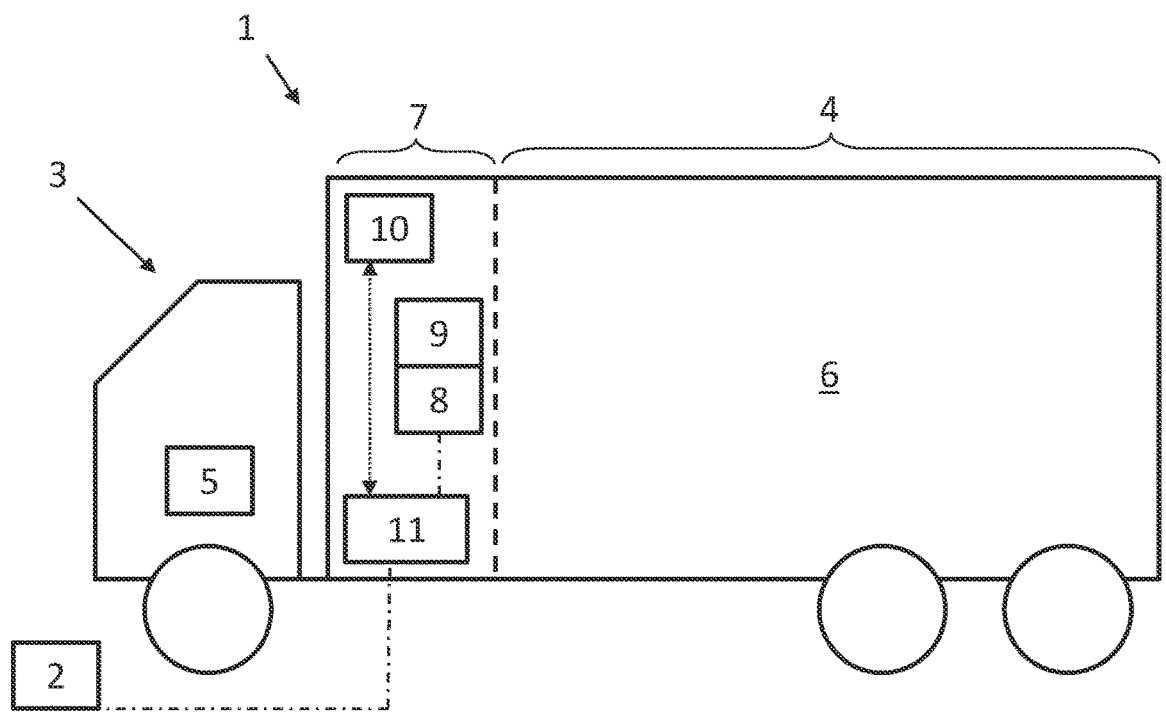
FIG. 1 shows a transport refrigeration system connected to a mains power source.

FIG. 1 shows a transport refrigeration system 1 connected to a mains power source 2.

The transport refrigeration system 1 is shown in combination with a vehicle 3. The transport refrigeration system 1 includes a transport container 4. The vehicle 3 includes a vehicle engine 5, and may include an engine controller configured to control the operation of the vehicle engine. The engine controller may be an electronic controller including a processor and an associated memory comprising computer-executable instructions that, when executed by the processor, cause the processor to perform various operations.

The transport container 4 comprises at least one refrigerated compartment 6. The refrigerated compartment 6 is operably coupled to a refrigeration unit 7 of the transport refrigeration system 1, i.e. in use, the refrigeration unit 7 cools the refrigerated compartment 6. The refrigeration unit 7 is operated to maintain and/or control an internal temperature of the refrigerated compartment 6.

The refrigeration unit 7 includes a refrigerant compression device 8, a refrigerant heat rejection heat exchanger (not shown), an expansion device (not shown), and a refrigerant heat absorption heat exchanger 9 connected in refrigerant flow communication in a closed loop refrigerant circuit and arranged in a conventional refrigeration cycle.

The refrigeration unit 7 may also include one or more fans (not shown) associated with the refrigerant heat rejection heat exchanger 9 and/or the refrigerant heat absorption heat exchanger.

The refrigerant compression device 8 may comprise a single-stage or multiple-stage compressor such as, for example, a reciprocating compressor or a scroll compressor. The compression device 8 has a compression mechanism (not shown) driven by an AC electric motor (not shown). The AC electric motor of the compression device 8 receives is supplied power via a power supply system 11.

The power supply system 11 is configured to be connected to a power source and draw electrical power to supply to the compression device 8 (and other components of the refrigeration unit 7). During a road mode of operation, the power supply system 11 is configured to draw power from an electric generator operatively associated with a prime mover (e.g. a diesel engine). When the transport refrigeration system 1 is connected to the mains power source 2, i.e. when the transport refrigeration system 1 enters a standby mode of operation, the power supply system 11 is configured to draw electrical power from the mains power source 2.

The power supply system 11 is configured to convert and/or transform the electrical power so that it is suitable for use by the AC electric motor of the compression device 8. It is therefore understood that the power supply system 11 may comprise various power conversion components such as AC to AC voltage/frequency converters, AC to DC rectifiers, DC to AC inverters, and DC to DC voltage converters.

The transport refrigeration system 1 also includes a controller 10 configured for controlling operation of the transport refrigeration system 1 including, but not limited to, operation of various components of the refrigeration unit 7 to provide and maintain a desired thermal environment within the refrigerated compartment 6.

Particularly, the controller 10 is configured to be able to operate the compression device 8 at variable speeds. For instance, during the standby mode, the controller 10 is configured to operate the compression device 8 in accordance with a first compressor speed. To exert such control, the controller 10 instructs the power supply system 11 to adjust the frequency and/or the voltage of the AC electrical power provided to the electric motor of the compression device 8. The AC electric motor 8 and the power supply system 11 together thus can be considered as a variable-frequency drive.

A method of controlling the refrigeration system 1 is now described.

Initially, the controller determines if the transport refrigeration system 1 is being operated in standby mode, i.e. if the transport refrigeration system 1 is connected to the mains power source 2. A transport refrigeration system 1 is likely to be operated in a standby mode when parked in a loading bay of a warehouse, for example. In response to determining that the transport refrigeration system 1 is connected to the mains power source 2, the controller 10 is configured to determine whether a current time is within a first time period. Simultaneously (or beforehand), the controller 10 provides a first compressor speed. The first compressor speed is determined to be less than a maximum speed of the compressor 8.

When it is determined that transport refrigeration system is being operated in the standby mode, and when it is determined that the current time is within the first time period, the controller 10 proceeds to operate the compressor 8 in accordance with the first compressor speed (i.e. the compressor speed limit).

In order to meet the cooling demand of the refrigerated compartment 6 of the transport refrigeration system 1, the compressor 8 may run during the first time period for longer, but at a reduced speed which does not exceed the compressor speed limit. Thus, while there may be operational benefits to running the compressor 8 at its maximum speed (e.g. taking less time for an internal temperature of the refrigerated compartment 6 to reach a target internal temperature), by limiting the speed at which the compressor 8 is able to run during the first time period, the peak noise produced by the compressor 8 is consequently also restricted.

Thus, when there a large number of transport refrigeration systems on standby in the same local area, for example in the loading bay of a warehouse (which may be situated in an urban or residential area where local noise regulations are implemented), the peak noise produced by the transport refrigeration systems can be restricted.

Operating the compressor 8 in accordance with the first compressor speed may comprise operating the compressor 8 in accordance with a speed profile. A compressor speed profile (i.e. a compressor speed/time table or graph) associated with a first time period may define the speed of operation of the compressor at a given instance. The speed profile may be continuous, discrete, or a combination of both. The speed profile may, during the first time period, comprise 'on' sub-periods where the compressor 8 is running at a non-zero speed that does not exceed the first compressor speed (i.e. the compressor speed limit). The speed profile may, during the first time period, comprise 'off' sub-periods where the compressor speed is designated to be 0 RPM (i.e. the compressor 8 is not being supplied with power and/or is not running).

The method may include providing, e.g. obtaining, measuring or otherwise determining, information about the transport refrigeration system 1, such as the internal temperature of the refrigerated compartment 6. Other information, such as the target internal temperature of the refrigerated compartment, a cooling capacity of the refrigeration unit and a maximum speed of the compressor 8, may also be provided.

Generally, the refrigeration demands of the refrigerated compartment 6 can be met even if the compressor 8 is operated in accordance with the compressor speed limit (i.e. the compressor 8 can be run for longer times at a reduced speed e.g. an 'on' sub-period of the first time period is longer). However, in some cases the obtained information may indicate that the refrigeration demands are not being met when the compressor 8 is being operated in line with the first compressor speed (compressor speed limit). For example, the internal temperature of the refrigerated compartment 6 may be identified as being outside a safe range of the set-point of the refrigerated compartment 6. This may occur as a result of a fault in the transport refrigeration unit 7, or the refrigerated compartment 6 (e.g. where a user leaves a door of the refrigerated compartment 6 open inadvertently). In this case, the controller 10 of transport refrigeration system 1 may be provided with an override mode which allows the compressor 8 to run at a speed that exceeds the compressor speed limit until the internal temperature of the refrigerated compartment 6 reaches the set-point, or at least is within a safe range of the set-point.

Figure 2:
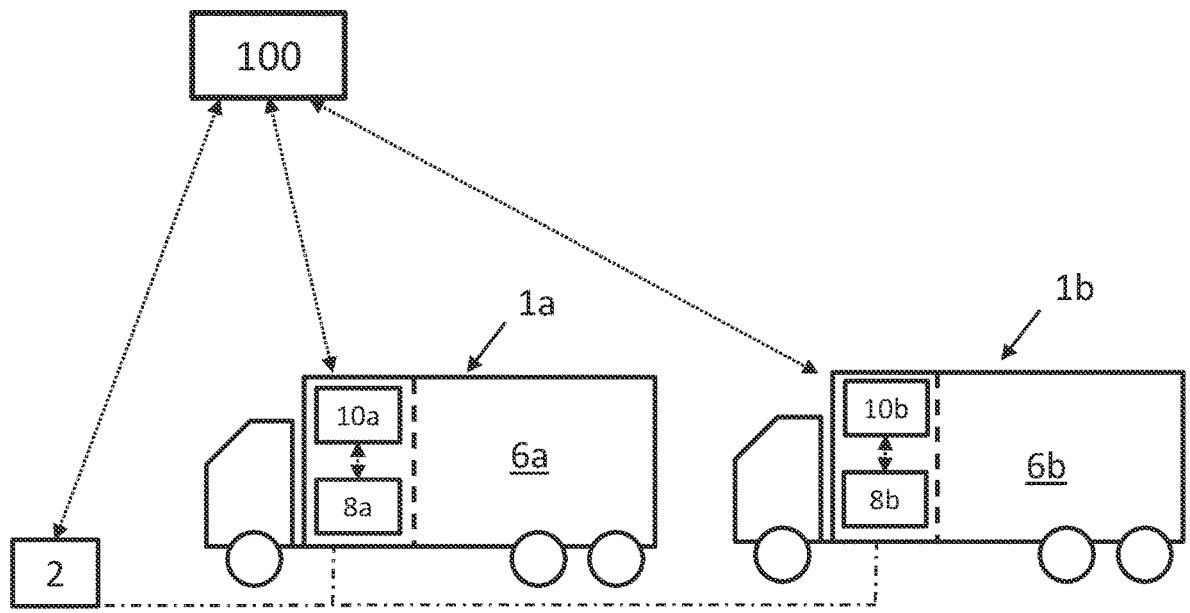
FIG. 2 shows a plurality of the transport refrigeration systems of FIG. 1 connected to a mains power source and in communication with a remote server.

FIG. 2 shows a plurality of transport refrigeration systems 1*a*, 1*b* connected to a mains power source 2 and in communication with a remote server 100.

The transport refrigeration systems 1*a*, 1*b* operate in a similar manner to the transport refrigeration system 1 as described above, but differ in the following aspects.

The controllers 10*a*, 10*b* of each of the transport refrigeration systems 1*a*, 1*b* are in communication with the remote server 100. This communication may be through a wireless connection, as illustrated, or a wired connection. The wireless connection may be a wireless communication method such as, for example, radio, microwave, cellular, satellite, or another wireless communication method.

The remote server 100 may be situated in a loading bay of a warehouse to coordinate the operation of the transport refrigeration systems 1*a*, 1*b*. As such, the remote server 100 may be configured to only establish communication with the controllers 10*a*, 10*b* of transport refrigeration systems 1*a*, 1*b* that are on-site, i.e. within a certain range of the remote server 100.

The remote server 100 may also be in communication with the mains power source 2. Thus the remote server 100 can identify which of the transport refrigeration systems 1*a*, 1*b* are being operated in a standby mode of operation based on which transport refrigeration systems 1*a*, 1*b* are connected to the mains power source 2. Alternatively the remote server 100 may obtain this information from the respective controllers 10*a*, 10*b* of the transport refrigeration systems 1*a*, 1*b*.

A method of controlling the system of FIG. 2 is now described.

The remote server 100 is provided with information including an internal temperature and a target internal temperature of the refrigerated compartment of each transport refrigeration system 1*a*, 1*b*.

The controller of each of the refrigeration systems 1*a*, 1*b* transmits at least the internal temperature of the corresponding refrigerated compartment 6*a*, 6*b* of each of the refrigerated systems 1*a*, 1*b* to the remote server 100. It may also transmit the target internal temperature of the corresponding refrigerated compartment 6*a*, 6*b*, or the remote server 100 may obtain the target internal temperature from elsewhere (e.g. a loading schedule, which dictates the perishable goods to be loaded into the respective refrigerated compartment 6*a*, 6*b* that may require a certain temperature environment).

The remote server 100, upon receiving this information, determines a set of compressor speeds comprising a compressor speed for each compressor 8a, 8b of the transport refrigeration systems 1a, 1b.

The remote server 100 then sends the set of compressor speed limits to the controllers and commands each controller to operate the respective compressor in accordance with the set of compressor speeds. The compressor speed acts as a compressor speed limit, i.e. operating the compressor in accordance with the assigned compressor speed comprises running the compressor at any suitable speed that is less than or equal to the first speed, including non-zero speeds and 0 RPM (i.e. the compressor is turned off).

Accordingly, the remote server 100 may process information concerning the internal temperature conditions of the refrigerated compartments 6a, 6b of the plurality of transport refrigeration systems 1a, 1b to determine which compressors 8a, 8b can afford to have their speed of operation restricted in order to reduce the peak noise produced at any one time by the compressors 8a, 8b.

For example, in FIG. 2, the internal temperature of the refrigerated compartment 6a of transport refrigeration system 1a may be further away from its target internal temperature than the internal temperature of the refrigerated compartment 6b of transport refrigeration system 1b. The remote server 100, in order to ensure the peak noise of operation of the compressors does not exceed a certain threshold, determines a compressor speed (compressor speed limit) for the compressor 8a of transport refrigeration system 1a and a compressor speed (compressor speed limit) for the compressor 8b of transport refrigeration system 1b. However, the compressor speed of the compressor 8a is higher than the compressor speed 8b during this period.

Similarly, the remote server 100 can calculate a speed profile for each compressor and each controller can thus operate the respective compressor in accordance with the speed profile. The speed profile for each compressor defines how the compressor should be operated during a certain period. As the remote server has access to the information of all the transport refrigeration systems 1a, 1b on standby, the remote server 100 is able to coordinate the speed profiles such that the peak noise of the operation of the compressors during a period is kept below a certain threshold. For example, with reference to FIG. 2, as the refrigeration units will not necessarily need to be running all the time during the standby mode, the 'on' sub-periods of the compressor 8a may be coordinated to coincide with when the compressor 8b is in an 'off' sub-period. Thus the peak noise produced during this time is kept reduced.

As briefly mentioned above, the remote server 100 may also have be provided with information such as a (future) loading schedule of plurality of transport refrigeration systems 1a, 1b. This allows the remote server 100 to prioritise the cooling of the refrigerated compartments 6a, 6b as necessary, while maintaining the noise restrictions.

For instance, in the event that transport refrigeration system 1a is to be loaded an hour before transport refrigeration system 1b, prior to loading the remote server 100 can prioritise the cooling of the refrigerated compartment 6a by increasing the associated compressor speed (compressor speed limit) and balancing the peak noise produced by the transport refrigeration systems 1a, 1b by correspondingly decreasing the compressor speed (compressor speed limit) associated with transport refrigeration system 1b.

The temperature information of one of the plurality of transport refrigeration systems 1a, 1b may further indicate that the transport refrigeration system 1a, 1b is faulty or not working correctly. Despite the operation of the respective refrigeration unit, the internal temperature of the refrigerated compartment 6a, 6b may be identified to not be within a safe range of the target internal temperature ('a safe range' being a temperature range in which perishable goods can be stored without damage or other undesirable effects). The refrigerated compartment 6a, 6b in question may have an internal temperature outside the safe range due to a defective component of the transport refrigeration system 1a, 1b, or may not be operating correctly because the transport refrigeration system 1a, 1b has been compromised e.g. the doors of the refrigerated compartment have been left open inadvertently for a length of time.

In this event, the controller 10a, 10b of the compromised transport refrigeration system 1a, 1b is able to override the instructions from the remote server 100, and operate the compressor 8a, 8b at a speed greater than the compressor speed. Therefore the controller 10a, 10b of each transport refrigeration system 1a, 1b is able to operate its respective compressor 8a, 8b in an override mode in which the operational instructions from the remote server 100 are overridden. Each compressor 8a, 8b may be run in the override mode until the information indicates the compressor 8a, 8b can be operated in accordance with its compressor speed i.e. the internal temperature of the refrigerated compartment 6a, 6b is within a safe range of the set-point.

Accordingly, the system and method provide peak noise reduction and control of the plurality of transport refrigeration systems 1a, 1b, while preserving effective temperature control of the refrigerated compartments 6a, 6b.

What is claimed is:

1. A method of controlling a transport refrigeration system, wherein the transport refrigeration system comprises a plurality of refrigerated compartments, each one of the plurality of refrigerated compartments being operably coupled to a respective refrigeration unit, each one of the refrigeration units comprising a compressor, and wherein the transport refrigeration system is operable in a standby mode in which the transport refrigeration system is connected to and powered by a mains power source, the method comprising:
   obtaining information including an internal temperature and/or a target internal temperature of each refrigerated compartment of the plurality of refrigeration compartments;
   determining, based on the information, a set of compressor speed profiles comprising a compressor speed profile for the compressor of each refrigeration unit;
   determining when the transport refrigeration system is being operated in the standby mode;
   determining whether a current time is within a first time period; and
   when it is determined that the transport refrigeration system is being operated in the standby mode, and when it is determined that the current time is within the first time period:
   operating each compressor in accordance with the corresponding compressor speed profile of the set of compressor speed profiles;
   wherein each compressor speed profile varies continuously and is complementary to at least one other of the set of speed profiles.

2. A method of controlling a plurality of transport refrigeration systems, wherein each transport refrigeration system of the plurality of transport refrigeration systems is controlled according to the method of claim 1.

3. A method according to claim 1, wherein the step of determining the set of compressor speed profiles is carried out by a remote server, and wherein the method comprises:
  transmitting at least some of the information to the remote server; and
  the remote server transmitting each compressor speed profile of the set of compressor speed profiles to the corresponding transport refrigeration system.

4. A method according to claim 1, wherein the method comprises:
  determining whether an internal temperature of a refrigerated compartment is outside a range with respect to a target internal temperature for that refrigerated compartment; and
  when it is determined that the internal temperature of the refrigerated compartment is outside the range:
  operating the compressor of the refrigeration unit operably coupled to that refrigerated compartment in an override mode in which the compressor is operated independently of the corresponding compressor speed profile for that compressor from the set of compressor speed profiles.

5. A transport refrigeration system operable in a standby mode in which the transport refrigeration system is connected to and powered by a mains power source, the transport refrigeration system comprising:
  a plurality of refrigerated compartments, each one of the plurality of refrigerated compartments being operably coupled to a respective refrigeration unit, each refrigeration unit comprising a compressor; and
  a controller, wherein the controller is configured to:
    obtain a set of compressor speed profiles comprising a compressor speed profile for the compressor of each refrigeration unit, wherein the set of compressor speed profiles is based on information including an internal temperature and/or a target internal temperature of each refrigeration compartment of the plurality of refrigeration compartments;
    determine when the transport refrigeration system is being operated in the standby mode;
    determine whether a current time is within a first time period; and
    when it is determined that the transport refrigeration system is being operated in the standby mode, and when it is determined that the current time is within the first time period:
    operate each compressor in accordance with the corresponding compressor speed profile of the set of compressor speed profiles;
  wherein each compressor speed profile varies continuously and is complementary to at least one other of the set of speed profiles.

6. A system comprising a plurality of transport refrigeration systems according to claim 5.

7. A system according to claim 6, wherein each transport refrigeration system of the plurality of transport refrigeration systems comprises a power supply system configured to be connected to the mains power source, and wherein the controller of each transport refrigeration system is configured to control the operation of each compressor of the plurality of refrigeration units of that transport refrigeration system by adjusting the frequency and/or voltage of AC power supplied to each compressor.

8. A system according to claim 6, wherein the controller of one or more transport refrigeration systems of the plurality of transport refrigeration systems is configured to:
  determine whether an internal temperature of a refrigerated compartment of the plurality of refrigerated compartments of that transport refrigeration system is outside a range with respect to a target internal temperature for that refrigerated compartment; and
  when it is determined that the internal temperature of the refrigerated compartment is outside the range:
  operate the compressor of the refrigeration unit operably coupled to that refrigerated compartment in an override mode in which the compressor is operated independently of the corresponding compressor speed profile for that compressor from the set of compressor speed profiles.

9. A server for coordinating the control of a plurality of transport refrigeration systems, wherein each transport refrigeration system comprises a plurality of refrigerated compartments, each one of the plurality of refrigerated compartments being operably coupled to a respective refrigeration unit, each one of the refrigeration units comprising a compressor, and wherein each controller of the one or more transport refrigeration systems is configured to transmit information including an internal temperature and/or a target internal temperature of each refrigerated compartment of the plurality of refrigerated compartments to the server; and
  wherein the server is configured to:
  obtain the information;
    determine, based on the information, a set of compressor speed profiles comprising a compressor speed profile for the compressor of each refrigeration unit of each transport refrigeration system of the plurality of transport refrigeration systems, wherein each compressor speed profile varies continuously and is complementary to at least one other of the set of speed profiles; and
    transmit each compressor speed profile of the set of compressor speed profiles to the controller of the corresponding transport refrigeration system.

10. A method of controlling a transport refrigeration system according to claim 1, wherein each compressor speed profile is configured to be out of phase with at least one other of the set of speed profiles.

11. A method of controlling a transport refrigeration system according to claim 10, wherein each compressor speed profile comprises a period of low-speed operation that coincides with a period of high-speed operation of at least one other of the set of speed profiles.

12. A transport refrigeration system according to claim 5, wherein each compressor speed profile is configured to be out of phase with at least one other of the set of speed profiles.

13. A transport refrigeration system according to claim 12, wherein each compressor speed profile comprises a period of low-speed operation that coincides with a period of high-speed operation of at least one other of the set of speed profiles.

14. A server according to claim 9, wherein each compressor speed profile is configured to be out of phase with at least one other of the set of speed profiles.

15. A server according to claim 14, wherein each compressor speed profile comprises a period of low-speed operation that coincides with a period of high-speed operation of at least one other of the set of speed profiles.

* * * * *